Dec. 24, 1935.  V. DUDICK  2,025,098
BRAKE FOR ELECTRIC MOTORS
Filed Dec. 4, 1934   3 Sheets-Sheet 2

INVENTOR
Victor Dudick
BY Martin T. Manion
ATTORNEY

Dec. 24, 1935.    V. DUDICK    2,025,098
BRAKE FOR ELECTRIC MOTORS
Filed Dec. 4, 1934    3 Sheets-Sheet 3
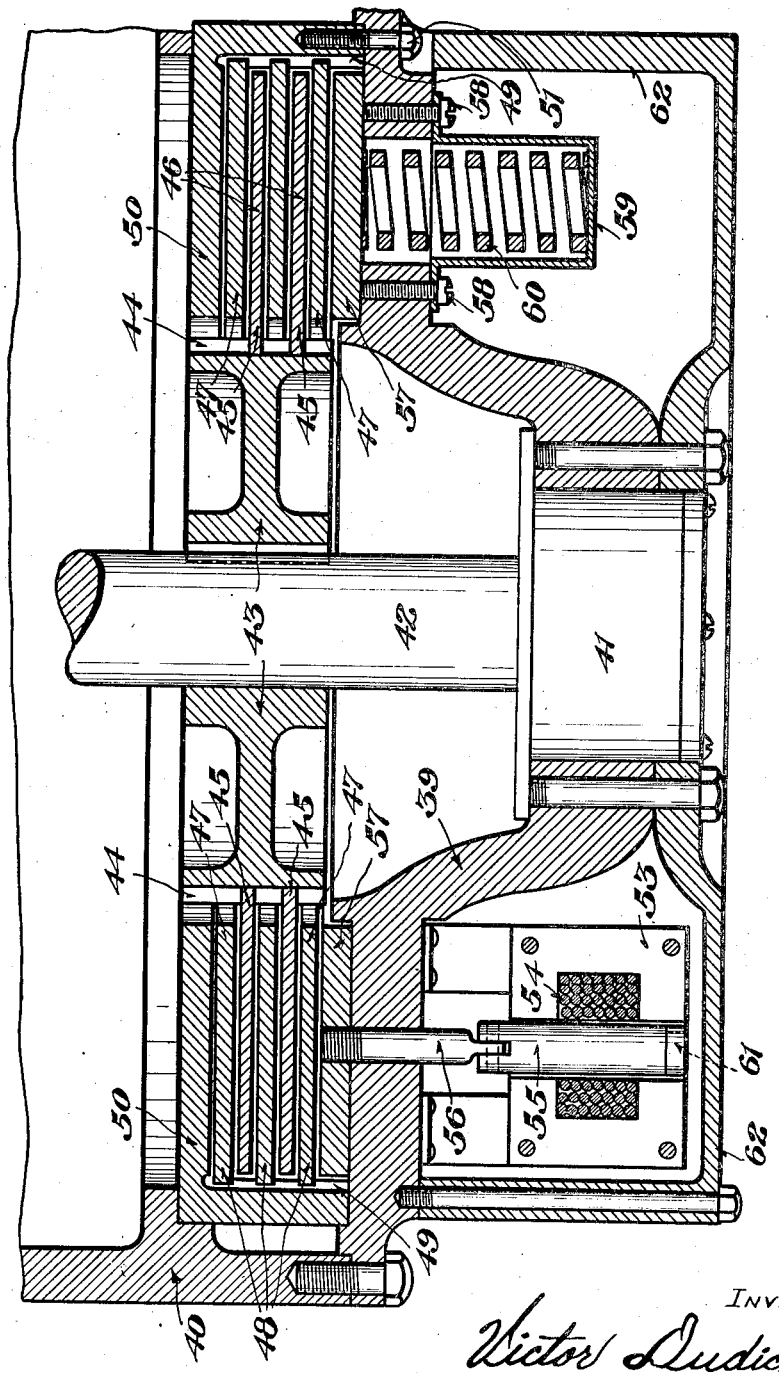

Patented Dec. 24, 1935

2,025,098

UNITED STATES PATENT OFFICE 2,025,098

BRAKE FOR ELECTRIC MOTORS

Victor Dudick, Belle Vernon, Pa.

Application December 4, 1934, Serial No. 755,889

6 Claims. (Cl. 188—171)

This invention relates to brakes for electric motors, and more particularly to a brake of disc type designed to prevent free or uncontrolled rotation of the rotor of the motor and associated parts thereof.

The primary object of the invention is to provide means whereby the rotation of the rotor of either a direct current or alternating current motor may be retarded, brought to a stop and the connected load held immovable, and the additional provisions of automatically controlled releasing means consisting of an electromagnet whereby said braking means are retracted and rendered inoperative permitting free, controlled rotation of said rotor and its associated elements.

A further object of the invention is to provide braking means which are maintained inoperative so long as a proper electric circuit is furnished to the motor with which it is associated.

A further object of the invention is to provide a braking mechanism of the character mentioned having a construction permitting the whole or partial dismantling of the motor without necessitating the dismantling of the braking mechanism, the braking mechanism and the rotor of the motor constituting a single unit assembly.

A further object is to provide housing means for the braking mechanism within an end bracket of the motor housing, the invention possessing practical merit because of its simplicity of construction, flexibility of operation and ease of installation.

A further object is to provide a construction of brake having ready accessibility for inspection and repairs, and being so constructed to provide substantially unrestricted heat dissipating ability.

Another object is to provide a brake of disc type in which the hubs of the rotating discs are extended so as to afford greater contacting surfaces within their intermeshing splines, and also in which the outer vertical edges of the non-rotating members are provided with extension flanges so as to afford greater bearing surfaces within the disc housing in which the mechanism is confined.

A still further object of the invention is to provide a mechanism of the foregoing character in which the bores of the hub extensions of the rotating discs are made progressively larger so that said hubs are adapted to occupy substantially nested relation, the alternating and co-operating non-rotating members being of various corresponding sizes in proportion to the sizes of the above mentioned hubs and discs.

A still further object of the invention is to provide a braking mechanism adapted, when so desired, to be manually released.

With these and other objects in view, the invention resides in the features of construction, arrangement of parts, and combinations of elements which will hereinafter be described, reference being had to the accompanying drawings, in which—

Figure 4 is an enlarged sectional view taken on line 4—4, Fig. 3.

Figure 1:
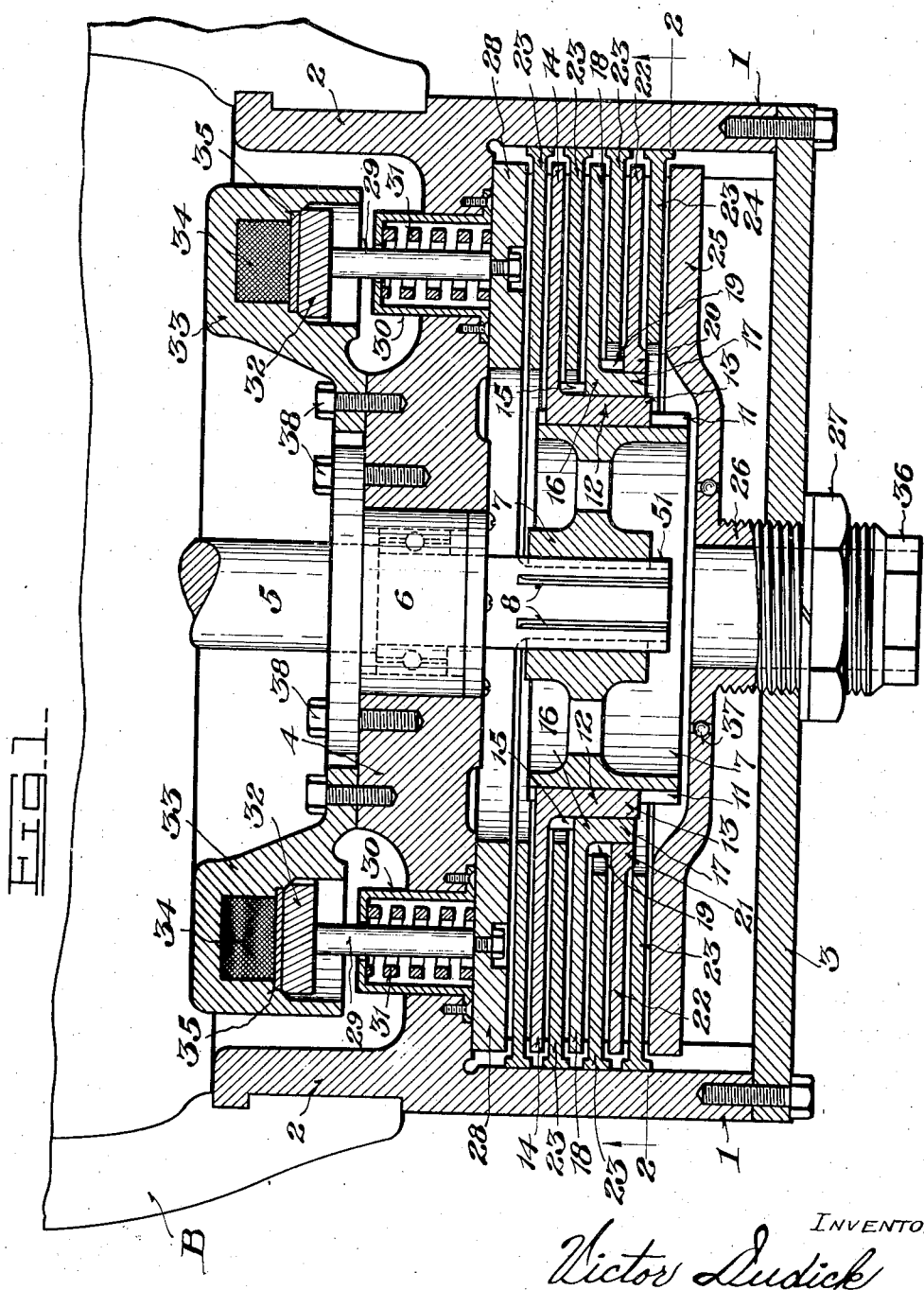
Figure 1 is a horizontal sectional view of the preferred form of the invention illustrating the same associated with a mill-type construction of a direct current electric motor, the upper section of the motor frame being removed.
Figure 2:
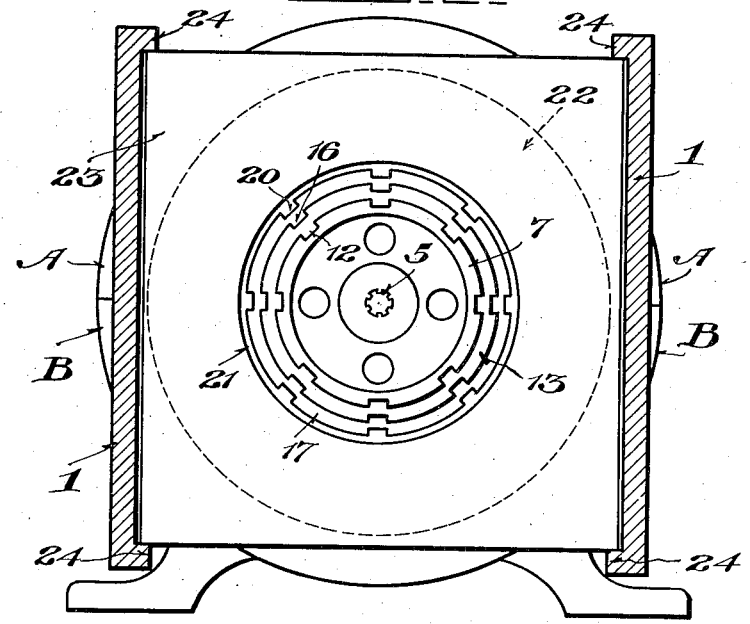
Figure 2 is a vertical sectional view, reduced, said section being taken on line 2—2, Fig. 1.

Referring particularly to Figs. 1 and 2 of the drawings, which figures disclose an embodiment of the invention for emergency, continuous and heavy duty service of mill-type motor, the reference numeral 1 designates a brake housing composed of two spaced parallel side plates removably attached to the motor frame by the provision of the groove 2 formed in the inner circular end of the housing and adapted to be received by the annular shoulder formed in the upper and lower sections A and B, respectively, of the motor frame. A cover plate 3 is bolted to the side members 1 to serve as a removable end closure therefor, the top and bottom being devoid of any covering so as to permit the escape of heat generated by frictional resistance as the result of continuous service and to permit of ready inspection of the confined mechanism. Said side plates 1 are connected by an integral transverse wall 4.

Located in the diametrical center of the brake housing and journaled within a bearing 6 provided in the transverse housing wall 4 is a shaft 5, the same being an extension of the power shaft of the motor. The end of said shaft 5 is designed to receive and have rotatable therewith a drum 7, the shaft adjacent the end thereof being provided with a plurality of splines 8 adapted to register with corresponding longitudinally extending fixed keys provided in the drum 7 so that the latter is splined to the shaft, although, if preferred, the drum may be fixed to the shaft.

The peripheral face of the drum 7 is provided with a plurality of spaced, parallel, horizontal splines 11 in which are slidably received corresponding fixed keys or feathers 12 provided on the inner face of the extended hub 13 of a rotatable braking disc 14, the circumferential edge of said disc 14 terminating at a short spaced distance from the side walls 1 of the housing.

The outer face of the extended hub 13 is provided with a plurality of splines 15, similar to the splines 11 of the drum, the splines 15 slidably receiving corresponding fixed keys 16 provided on the inner face of the extended hub 17 of a second rotatable braking disc 18, which hub is shorter and has a larger bore than the bore of the hub 13 and which disc also terminates at a short spaced distance from the side walls 1 of the housing.

Likewise, the outer face of the extended hub 17 is provided with a series of splines 19, similar to the splines 11 and 15, said splines 19 slidably receiving corresponding fixed keys 20 provided on the inner face of a larger bored and shorter hub 21 of another rotatable braking disc 22, the circumferential edge of said disc terminating at the same outward distance as the discs 14 and 18.

From the foregoing, it will be understood that the drum 7 and each of the discs 14, 18 and 22 are rotatable with the shaft 5, the discs having free horizontal motion along the respective splines, each of the discs, except the innermost disc 14, being slidable on the hub of the next succeeding disc.

Interposed in alternating relation between each rotating braking disc is a rectangular non-rotating plate 23, said plates being maintained in position in the housing between horizontally extending shoulders 24 provided at the top and bottom of the side walls 1, said plates having free sliding movement along said shoulders. Moreover, said plates are appropriately apertured at their diametrical centers so as to be spaced away from the hubs of the respective rotating discs with which they are associated. The vertical edges of each plate 23 are provided with vertical ribs on opposite faces thereof, as shown in Fig. 1, so as to increase the surface contacting area on the side walls of the housing.

Outward horizontal sliding movement of the discs and plates is limited and regulated by the provision of a horizontally adjustable end plate 25 having an integral tubular exteriorly threaded extension 26 in the center thereof designed to be received by a threaded aperture provided in the cover plate 3, and maintained in fixed position by means of the nut 27.

The brake discs and plates are designed to be pressed together in contacting face to face relation for applying the required frictional resistance to retard or stop rotation of the shaft 5 and the rotor of the motor by means of a slidable thrust plate 28 connected and supported by one end of a plurality of plunger pins or stems 29.

Snugly fitted within suitable apertures provided in the transverse wall 4 of the housing are cylindrical cups 30 which have annular flanges surrounding the open end and being bolted to the wall for rigidly retaining the cups in place, each cup serving as a thimble-like housing for one of the stems 29 and also serving as a housing for a spiral compression spring 31 interposed between the inner closed end of the cup and the thrust plate 28. Manifestly, the force exerted by the springs 31, which latter are equally distributed about the thrust plate 28, normally maintain a constant pressure against the latter so that the alternating discs and plates are brought together in face to face contacting frictional relation and rotation of the shaft 5 and rotor is thereby stopped and/or maintained non-rotatable. If preferred, the opposite surfaces of each brake disc may be faced with an appropriate friction lining, as, for instance, woven asbestos fabric.

The inner end of each of the plunger pins 29 is fixed to a ring-like magnet armature 32 adapted to be received within and have associated therewith an annular electromagnet 33 attached to the wall 4, as shown at 38, the energizing coil of the magnet being shown at 34 and the coil keeper being shown at 35.

Inasmuch as the thrust plate 28 is mechanically connected to the various stems 29 and magnet armature 32, electrical current supplied to the magnet by any appropriate circuit, preferably controlled by the motor circuit, and traveling through the magnet coils 34 induces a flux which attracts the armature 32, stems 29 and the thereby connected thrust plate 28 against the force of the springs 31. Thus, the pressure exerted on the braking discs and plates is released, and, as a consequence, the same are brought out of frictional relation and the rotor of the motor is left free to rotate. Simultaneously with the breaking of the current to the coils of the magnet the springs 31 force the discs and plates into instant frictional braking position.

Adjustment of the longitudinal movement of the discs and plates is provided by means of the end plate 25. Adjustment thereof is effected by unthreading the retaining nut 27 and, by means of a wrench applied to the squared end 36 of the tubular extension 26, manually rotating the end plate in the desired direction to tighten or loosen the discs and plates. The brake may be manually released in a similar manner.

Manual rotation of the end plate 25, as aforesaid, is effected with ease due to the plate being composed of two sections, the inner section being of circular disk shape and the outer section being of substantially ring shape to encircle the periphery of the inner section, the former being freely rotatable with the latter; a ball race being provided in the confronting edges to receive ball or roller thrust bearings 37, as shown in Fig. 1. This construction permits the end plate 25 being adjusted in such manner that no friction between said plate 25 and the outermost plate 23 need be overcome in order to rotate the adjusting plate.

The extension 26 of the adjustable end plate 25 is made of hollow form to permit temporary attachment of a tachometer to the shaft 5 for determining the speed of the motor.

From the foregoing description, it will be seen that the structure can be readily detached from the motor merely by removing the upper segment A of the motor frame and lifting from the lower segment B the braking mechanism and rotor as a unit, no dismantling being required. Likewise, a replacement braking mechanism may be as readily installed. Furthermore, the rotor of the motor may be conveniently detached from the braking mechanism without the necessity of disassembling any portion of the brake.

Figure 3:
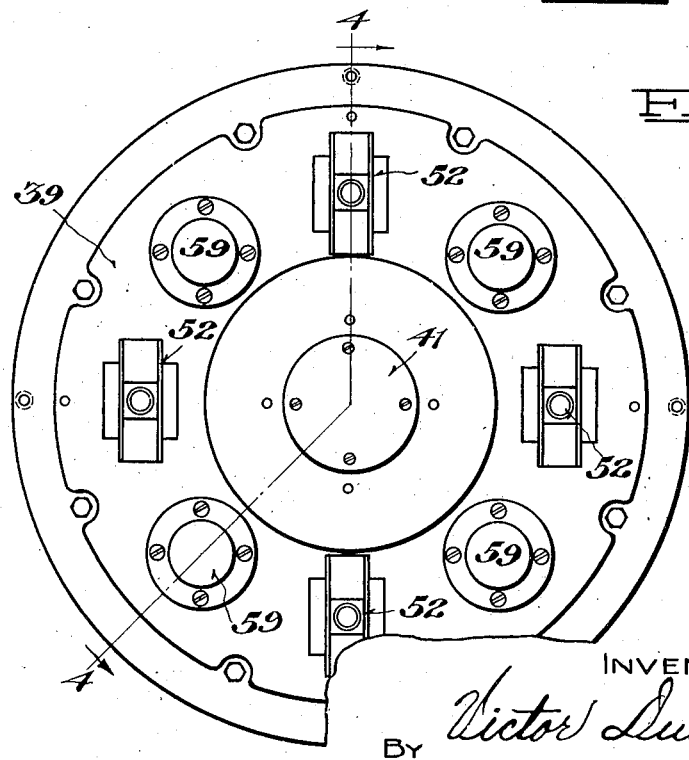
Figure 3 is an end view of a modified form of the invention applied to an alternating current motor, the end closure being removed.

The modified construction illustrated in Figs. 3 and 4 of the drawings illustrates a braking mechanism for use on motors where the mechanism is not subjected to continuous service or usage, or where braking force to the motor need be exerted only at infrequent intervals.

In this latter construction, an end plate bracket 39 is bolted to one end of the motor frame 40, and has supported in the diametrical center thereof a bearing 41 in which is journaled one end of the shaft 42, the latter being an extension of the rotor. Keyed to the shaft 42 is a rotatable drum 43 having a series of splines 44 in its peripheral face to receive fixed keys 45 formed integral with the central bore of the rotating discs 46.

Interposed between the rotating discs 46 in alternating relation are a plurality of non-rotatable plates 47, apertures being provided centrally of the plates so as not to contact the drum 43 and having a plurality of spaced teeth 48 formed integral with the circumferential edge to register with spaced longitudinal splines 49 provided on the inner wall of a disc housing 50, such an arrangement preventing rotation of the plates while permitting longitudinal movement. The discs 46 and plates 47 are encased in the housing 50 fastened on the inner side of the end bracket by means of bolts 51.

Circularly arranged and appropriately fastened on the outer face of the end bracket 39 are a plurality of equally spaced solenoid magnets 52, each consisting, as shown in Fig. 4, of a laminated core 53 and coil 54. Operable in said magnet is an armature 55 having pivotally attached to the free end thereof a plunger pin 56 whose opposite end is threadedly received by the slidable thrust plate 57.

Interposed between each of the magnets 52 and attached to the end plate by bolts 58 are a plurality of cylindrical cups 59 housing spiral compression springs 60 which exert an inward force upon the pressure plate 57.

The braking mechanism, as will be readily understood, is actuated to operative position by the pressure of the various springs 60 against the thrust plate 57, and the brake is released and rendered inoperative upon the magnets 52 being energized to attract the respective armatures 55 which retracts the thrust plate 57 against the lesser force exerted by the springs 60.

A shading coil 61 is carried by the armature to counteract chattering.

An end closure 62 houses the mechanism and prevents the entrance of dust and other objectionable foreign substances.

While the invention has been described more or less in detail, it will be understood that the essential elements of either of the forms illustrated and described may be utilized in suitable combinations to afford appropriate braking mechanism depending upon the character of brake desired as well as the type of motor to receive the braking mechanism. Either structure, or any predetermined selected combination thereof, is adapted to serve as an auxiliary mechanical brake in association with motors having other braking means, as, for instance, that type of motor in which the rotor thereof is equipped with braking winding.

Furthermore, while the mechanism has herein been described as consisting of a multiple of braking discs, the invention also contemplates the use of a single disc.

What is claimed is—

1. In a disc brake for electric motors, a brake housing removably supported within an end of the motor frame, a rotor shaft within said housing having a drum splined thereon and rotatable therewith, a plurality of discs carried by the periphery of said drum and having longitudinal sliding movement with respect thereto, a plurality of non-rotatable plates interposed in alternate relation between said discs, means including a spring pressed thrust plate whereby the faces of the alternate discs and plates may be brought into frictional contacting relation with each other to interrupt the rotation of said drum and rotor shaft, and a retractable end plate opposed to the thrust plate whereby the discs and plates may be manually released from frictional braking relation.

2. In a disc brake for electric motors, a housing having an open top and bottom supported within an end of the motor frame, a rotatable shaft within said housing having a drum carried thereby and rotatable therewith, a plurality of rotating discs carried by the periphery of said drum and longitudinally slidable with respect thereto, said discs having hub extensions of differing bores to permit nesting of said hubs on said drum, non-rotatable plates occupying alternating relation to the opposite faces of said discs, mechanical means, including a spring pressed thrust plate for positioning said discs and plates in frictional contacting relation, other means, utilizing electromagnetic force controlled with the motor circuit, for retracting said thrust plate against the tension of the exerted spring force to release the discs and plates from frictional relation, said non-rotating plates having faces of varying areas to correspond with the relative surface areas of the discs with which they are associated.

3. In a disc brake for electric motors, a brake housing supported within an end of the motor frame, a rotor shaft within said housing having a drum splined thereon and rotatable therewith, a plurality of discs carried by the periphery of said drum and having sliding movement with respect thereto, said discs having hub extensions of differing bores to permit nesting of said hubs on said drum, a plurality of non-rotatable plates interposed in alternate relation between said discs and having faces of varying areas to correspond with the relative surface areas of the discs with which they are associated, a thrust plate for positioning said discs and plates in frictional contacting relation, an annular electromagnet attached to the brake housing and having associated therewith a ring-like magnet armature, said armature having a plurality of stems connecting it with the thrust plate whereby said discs and plates may be moved to non-contacting relation when said electromagnet is energized.

4. In a disc brake for electric motors, a brake housing supported within an end of the motor frame, a rotor shaft within said housing having a drum splined thereon and rotatable therewith, a plurality of discs carried by the periphery of said drum and having sliding movement with respect thereto, a plurality of non-rotatable plates interposed in alternate relation between said discs, a thrust plate for positioning said discs and plates in frictional contacting relation, an annular electromagnet attached to the brake housing and having associated therewith a ring-like magnet armature, said armature having a plurality of stems connecting it with the thrust plate whereby said discs and plates may be moved and maintained in non-contacting relation when said electromagnet is energized, and a compression spring encircling each of said stems and received within a thimble-like housing for exerting a force on said thrust plate counter to the attraction of the electromagnet.

5. In a disc brake for electric motors, a brake housing supported within an end of the motor frame, a rotor shaft within said housing having a drum splined thereon and rotatable therewith, a plurality of discs carried by the periphery of said drum and having sliding movement with respect thereto, said discs having hub extensions of differing bores to permit nesting of said hubs on said drum, a plurality of non-rotatable plates interposed in alternate relation between said discs and having faces of varying areas to correspond with the relative surface areas of the discs with which they are associated, a thrust plate adapted to contact the innermost of said plates for positioning said discs and plates in frictional relation, an electromagnet having an associated magnet armature disposed within said housing inwardly of said thrust plate, and means connecting said thrust plate and said armature whereby said discs and plates may be moved to and maintained in non-contacting relation when said electromagnet is energized.

6. In a disc brake for electric motors, a brake housing removably supported within an end of the motor frame, a rotor shaft within said housing having a drum splined thereon and rotatable therewith, a plurality of discs carried by the periphery of said drum and having longitudinal sliding movement with respect thereto, a plurality of non-rotatable plates interposed in alternate relation between said discs, means including a spring pressed thrust plate whereby the faces of the alternate discs and plates may be brought into frictional contacting relation with each other to interrupt the rotation of said drum and rotor shaft, and a retractable end plate opposed to the thrust plate whereby the discs and plates may be manually released from frictional braking relation, said end plate being composed of two sections, the inner section being of circular disc shape and the outer section being of ring shape and encircling the periphery of the inner section, and anti-friction means provided between the confronting edges of said sections.

VICTOR DUDICK.